United States Patent Office 3,024,012
Patented Mar. 6, 1962

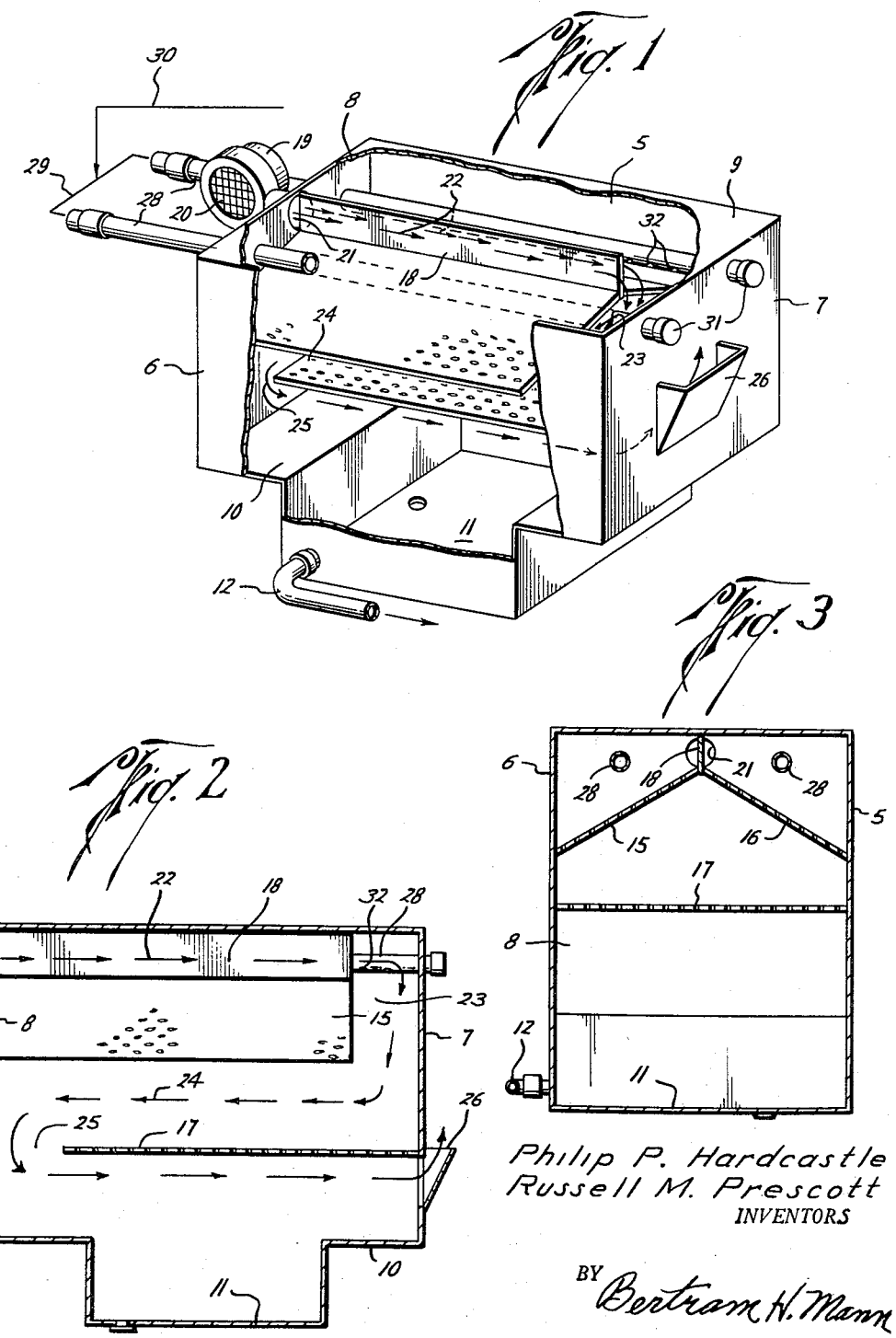

3,024,012
LIQUID COOLING APPARATUS
Philip P. Hardcastle and Russell M. Prescott, Wichita, Kans., assignors to Cardwell Manufacturing Company, a partnership
Filed Oct. 15, 1959, Ser. No. 846,699
2 Claims. (Cl. 261—111)

This invention relates to apparatus for cooling liquid, such as, for instance, the water circulated through the hydraulic brake system.

The braking system frequently used in connection with the draw works of an oil field rig requires the supply of substantial volumes of cool water in order to maintain its efficiency. Consequently, a recirculation system with a compact yet efficient cooling apparatus for the water results in more efficient operation of the braking system and permits the utilization of a minimum quantity of water for this purpose.

It is the main object of the present invention to provide such a cooling apparatus.

According to the present invention, this object is achieved by spraying the heated liquid returned from the water using device into the upper portion of a confined space, collecting and re-comminuting the sprayed liquid at intervals during its downward fall in the space, circulating streams of air back and forth across the paths of the descending liquid, and collecting the liquid at the bottom of the confined space for reuse. The novel apparatus consists of a casing having vertically spaced perforated baffles therein, a pair of liquid spraying nozzles in the upper portion thereof, and an air blower also directed into the upper portion. The baffles are provided with cross passages for directing the air stream back and forth across the baffles.

In the accompanying drawings which illustrate the invention,

FIG. 1 is an isometric view and diagram of the novel apparatus, the forward wall being broken away to illustrate the underlying parts.

FIG. 2 is a vertical transverse section through the apparatus.

FIG. 3 is a vertical section taken at 90° to FIG. 2.

The apparatus consists of a casing having front and back walls 5 and 6, side walls 7 and 8, and top and bottom walls 9 and 10. Bottom wall 10 is recessed as at 11 to form a collecting basin from which a pipe 12 returns the collected and cooled liquid to the liquid using system.

Mounted within the casing are perforated baffles 15 and 16 disposed in an inverted V, and horizontal baffle 17 spaced therebeneath. A divider partition 18 extends from the apex of baffle 15, 16 substantially to top wall 9. An air blower 19 has an inlet 20 outside the casing and an exhaust 21 directed into the upper part of the casing and divided by partition 18 to supply streams of air above baffles 15 and 16 and flowing thereacross, as represented by arrows 22. The latter baffles terminate short of side wall 7 to form a down or cross passage 23 for directing the stream of air around the end of baffles 15 and 16 and thence back, as represented by the arrows 25, across lower perforated baffle 17. Baffle 17, in turn, terminates short of casing side wall 8 to form a cross or down passage 25 leading around baffle 17 for directing the air stream downwardly across baffle 17 thence back beneath the baffle. Air is exhausted from the casing through a discharge spout 26. Water is fed into the top of the casing through pipes 28 connected by a manifold 29 to the return passage from the water using device, represented diagrammatically by line 30. Pipes 28 extend entirely across the casing, respectively above and centrally of baffles 15 and 16, and their distal extremities are supported in opposite wall 7 where they are capped, as at 31. The portions of pipes 28 within the casing are perforated, as at 32, forming nozzles for spraying the liquid upon baffles 15 and 16.

In operation, hot liquid is directed through piping lines 30 and 29, to perforated pipes 28, whence it is sprayed onto baffles 15 and 16, the liquid thus collected runs down these latter-mentioned baffles, thence is re-comminuted in dropping through the perforations thereof onto lower baffle 17, where the droplets are again temporarily halted and re-comminuted in passing through the perforations of this latter baffle. At the same time, air is blown from exhaust duct 21 in dual streams, first across upper baffles 15, 16, thence downwardly around these baffles, back between the vertically spaced baffles, downwardly around baffle 17, and finally across the space beneath the lower baffle and out through discharge nozzle 6. The evaporation and consequent cooling of the liquid are accelerated by the spraying and successive collecting and re-comminuting thereof, as well as by the back and forth air currents. The cooled liquid is collected in recessed sump space 11 for resupply through piping 12 and a suitable water pump to the consuming device.

The size of the casing and the number of baffles may be varied in accordance with the quantity of liquid which must be cooled and the rate of cooling desired. The invention may be modified in these and other respects as will occur to those skilled in the art and the exclusive use of all modifications as come within the scope of the appended claims is contemplated.

We claim:

1. Liquid cooling apparatus comprising a casing, a pair of perforated baffles mounted therein in inverted V relationship, a vertical divider panel extending upwardly from the apex of said pair of baffles, a second, horizontally extending, perforated baffle spaced directly beneath said first baffles, means to discharge comminuted liquid above each of said pair of baffles for dripping through said baffles, means to draw off said liquid from the bottom of said casing, and means to discharge a stream of air into said casing from one side thereof across the upper surfaces of each of said first pair of baffles, there being a down passage around said pair of baffles adjacent the opposite side of said casing for directing said air stream therethrough, thence back to said first side between said baffles for assisting in vaporization and cooling of the dripping liquid.

2. Liquid cooling apparatus as described in claim 1 further including an air outlet below all of said baffles and a second down passage around said second baffle opposite and in staggered relationship to both said first down passage and said air outlet passage for directing the air stream around said second baffle thence back beneath the same to said outlet.

References Cited in the file of this patent

UNITED STATES PATENTS

| 64,452 | Schweikhart | May 7, 1862 |
| 124,065 | Kennedy et al. | Feb. 27, 1872 |
| 652,463 | McCreery | June 26, 1900 |
| 815,031 | Newhall | Mar. 13, 1906 |
| 980,108 | Lillie | Dec. 27, 1910 |
| 1,738,543 | Travers | Dec. 10, 1929 |
| 1,810,410 | Alldredge | June 16, 1931 |
| 2,890,870 | Spiselman | June 16, 1959 |

FOREIGN PATENTS

| 28,504 | Great Britain | Dec. 10, 1912 |